Figure 1:
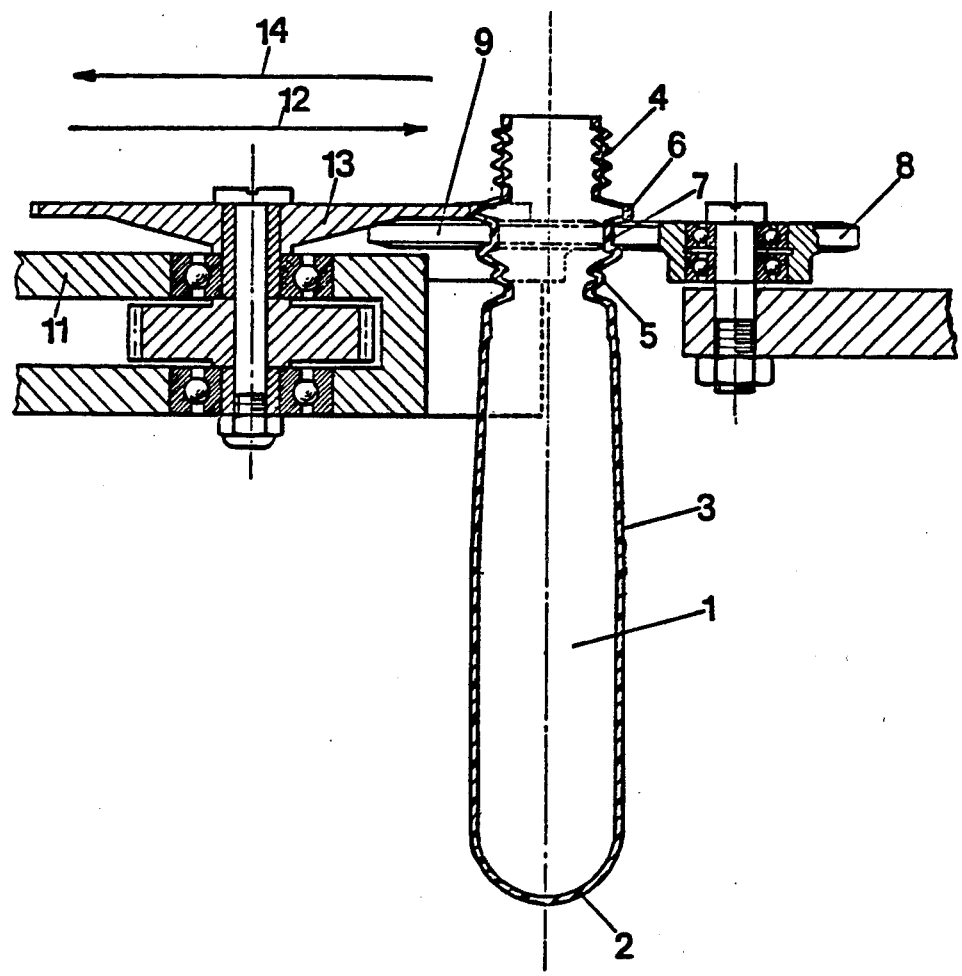

United States Patent [19]

Branchadell

[11] 4,451,426
[45] May 29, 1984

[54] PROCESS FOR BLOW-MOLDING A HOLLOW ARTICLE FROM A PREFORM MADE FROM A THERMOPLASTIC

[75] Inventor: José Branchadell, Wezembeek-Oppem, Belgium

[73] Assignee: SOLVAY & Cie, Brussels, Belgium

[21] Appl. No.: 350,098

[22] Filed: Feb. 18, 1982

[30] Foreign Application Priority Data

Feb. 23, 1981 [FR] France ................................ 81 03708

[51] Int. Cl.³ .............................................. B29C 17/07
[52] U.S. Cl. .................................... 264/535; 215/1 C; 425/525; 425/526; 428/35; 432/11; 432/124
[58] Field of Search ....................... 264/521, 530, 535; 425/525, 526, 534; 432/11, 124; 428/35, 36; 215/1 C

[56] References Cited

U.S. PATENT DOCUMENTS 4,212,841  7/1980  Michael ............................... 264/530

Primary Examiner—Jan H. Silbaugh
Attorney, Agent, or Firm—Spencer & Frank

[57] ABSTRACT

The preform (1) for the production of hollow articles by blow-moulding possesses a profiled false neck (4) provided with a circular toothed collar (6), and during the thermal conditioning of the preform for the purpose of final blowing, the preform, held loosely by idling holding rollers (8) (9) at the level of the profiling of its false neck (4), is caused to rotate about its longitudinal axis by a toothed drive member (13) which cooperates with the circular toothed collar (6).

3 Claims, 2 Drawing Figures

PROCESS FOR BLOW-MOLDING A HOLLOW ARTICLE FROM A PREFORM MADE FROM A THERMOPLASTIC

The present invention relates to a preform made from a thermoplastic, for the production of a hollow article, such as a bottle, by blow-moulding, and to a process for moulding a hollow article from such a preform.

In the production of hollow articles from a thermoplastic by blow-moulding, it is common practice to mould preforms, in a first stage, from the chosen thermoplastic and then, in a second stage, to blow-mould the desired hollow articles from these preforms. This technique is in particular used in injection blow-moulding installations and in installations for the production of molecularly oriented hollow articles, in which it has proved necessary to condition the thermoplastic thermally, at the preform stage, to the temperature at which it is subjected to molecular orientation by stretching, before proceeding to the final blowing.

In processes of this type, it is known to mould preforms which have a body of cylindrical general shape surmounted by a profile false neck. The term false neck is intended to designate any portion of the preform which is located above the part of the preform which forms, or is intended to form, the true neck of the desired hollow article. This portion is generally profiled and is used for preform handling operations. This false neck is removed either before or after final blowing. In general, the plastic material of which the false neck consists is recycled after grinding. This false neck can be closed or open, depending on the moulding technique used for the production of the preform.

Before carrying out the final blowing, the preform is brought to the ideal temperature for this final blowing. Ideally, the temperature should be as uniform as possible over the circumference of the preform and across its thickness, so as to avoid any distortion of the thermoplastic during the final blow-moulding.

It is known that for this purpose the preforms can be caused to rotate about their longitudinal axis during their thermal conditioning prior to final blowing.

Thus, U.S. Pat. No. 3,947,243 filed on Dec. 30, 1976 and granted to BELOIT CORPORATION has described a thermal conditioning oven through which the tubular parisons or preforms are conveyed whilst they are caused to rotate about their longitudinal axis. For this purpose, the successive tubular parisons are threaded on spaced-out supports mounted, in a manner which permits rotation, on a conveyor passing through the oven. These supports are provided, at their base, with a gearwheel which cooperates with the tufts of the bristles of a fixed brush, appropriately placed, whilst the supports travel through the oven, thus causing the rotation of the supports and consequently of the tubular parisons threaded onto them. The oven described thus necessarily entails resorting to elaborate supports mounted vertically on the conveyor, and to threading of the successive parisons onto these supports. Moreover, the rotation which successive parisons are caused to undergo is not uniform and it is not possible to ensure identical angular orientation of the successive parisons after thermal conditioning. Consequently it is necessary to provide angular positioning of the treated tubular parisons before they are shut in the final blow mould, especially where, for example, these parisons have a threaded neck which has been premoulded in its definitive shape.

The first object of the present invention is a special preform possessing a false neck, for the production of hollow articles from a thermoplastic by blow-moulding, which preform is specially designed so that it can be caused to rotate about its longitudinal axis whilst undergoing thermal conditioning, without requiring a complicated apparatus and with perfect control of the rotation.

Accordingly, the present invention relates to a preform, made from a thermoplastic, for the production of hollow articles by blow-moulding, comprising a body of cylindrical general shape surmounted by a profiled false neck, in which preform the false neck possesses a circular toothed collar located in a plane at rightangles to the longitudinal axis of the preform.

The circular toothed collar with which the false neck of the preform according to the invention is equipped can easily be produced during moulding—for example by injection or blowing—of the preform, using a mould having a suitable cavity; moreover, this toothed collar can be moulded with precision, because the thermoplastic is brought to its optimum moulding temperature during the moulding of the preform.

The circular toothed collar provided on the false neck of the preform can easily be utilised subsequently, as will be described later, for causing the preform to rotate during its thermal conditioning prior to final blow-moulding. Furthermore, because this collar forms and integral part of the false neck, it is removed in the course of trimming off the false neck of the hollow article which is ultimately moulded, and thus does not appear on the finished hollow article.

The circular toothed collar can be moulded in recessed or relief form on the false neck, the second embodiment being generally preferred for preforms which have a false neck of minimum external diameter less than 40 mm.

The circular toothed collar can possess from 5 to 30, and preferably from 8 to 20, teeth, and the ratio of the external diameter of the toothed collar at the extremities of the teeth to the external diameter of the toothed collar at the valleys between the teeth is between 1.05 and 3 and preferably between 1.1 and 2.

The profile of the teeth of the circular toothed collar can be chosen as desired and these teeth can be solid or be moulded hollow. The height of the circular toothed collar is generally between 1 and 20 mm. The preform according to the invention can have a closed or open bottom and can have a true neck which has been moulded at least partially in its definitive shape.

In a particular embodiment, the preform can be provided with a definitive moulded true neck possessing an external thread which can subsequently be used for closing the final hollow article, for example by means of a screw closure.

The profiling of the false neck of the preform can advantageously possess an external circular groove or ridge which can be used to hold the preform loosely when it is subsequently caused to rotate during thermal conditioning. The preform according to the invention can have a length substantially equal to the height of the final hollow article produced from the preform, or a length less than this height, the latter characteristic being preferred if the preform is intended for the production of a molecularly oriented final hollow article.

The preform according to the invention can be produced from any plastic suitable for the production of hollow articles by blow-moulding. For example, there may be mentioned resins based on vinyl chloride, polymers and copolymers produced from alpha-olefines containing up to 8 carbon atoms in their molecule, fluorinated polymers such as polyvinylidene fluoride, acrylic polymers and copolymers and especially those produced from acrylonitrile, thermoplastic polyesters, such as polyethylene glycol terephthalate, and polycarbonates.

A further object of the present invention is a process for the production of a hollow article by blow-moulding, in which a preform as described above is used.

In the process according to the invention, a preform as described above is moulded, the preform is subjected to thermal conditioning and the desired hollow article is then blow-moulded from the conditioned preform, using the circular toothed collar provided on the false neck of the preform for causing the rotation of the preform about its longitudinal axis during the thermal conditioning.

The preform can be caused to rotate during thermal conditioning by means of a suitable toothed driving member such as a toothed gearwheel or a rack cooperating with the circular toothed collar provided on the false neck of the preform.

In an advantageous embodiment of the process according to the invention, the preform is held loosely, during thermal conditioning, by means of appropriate holding members such as idling rollers, which cooperate with the profiling of the false neck and especially with an external groove or ridge provided on this false neck. rhe preform can also be held by an appropriate ring into which the preform is inserted and on which it rests by the base of the circular toothed collar.

In the process according to the invention, it is possible to control the movement of the toothed driving member in such a way as to permit a constant indexing of the angular position of the successive preforms after thermal conditioning. This embodiment of the process according to the invention has proved particularly advantageous when the preforms employed have a definitive moulded neck possessing an external thread which is ultimately used for closing the hollow article. In this case it is in fact important to position the thermally conditioned preforms correctly in the final blow mould so as to avoid any danger of damage to the moulded necks of the preforms and in particular to their threads. By controlling the movement of the driving member it is possible to maintain very precise angular indexing of the conditioned preforms and hence to guarantee that they are correctly introduced into the final blow mould.

In another embodiment of the process, in which the preforms pass in linear motion before heating elements, rotation of the preforms can be achieved by means of a rack or a fixed chain which engages with the circular toothed collar provided on the false neck of the preforms.

The preform according to the invention, and the process for its use in the production of hollow articles by blow-moulding, are particularly suitable for the production of molecularly oriented hollow articles because, with them, it is possible to control very precisely the thermal conditioning to the orientation temperature before final blowing. Furthermore, by making use of the possibility of controlling the angular indexing of the preforms, it is possible directly to mould the neck, which may or may not be threaded, of the final hollow article in the course of moulding the preform, that is to say at an instant when the plastic is at an ideal moulding temperature, and thus to avoid having to shape this neck during final blowing, that is to say at an instant when the thermoplastic is at a lower, molecular orientation temperature which does not permit such precise moulding.

Figure 2:
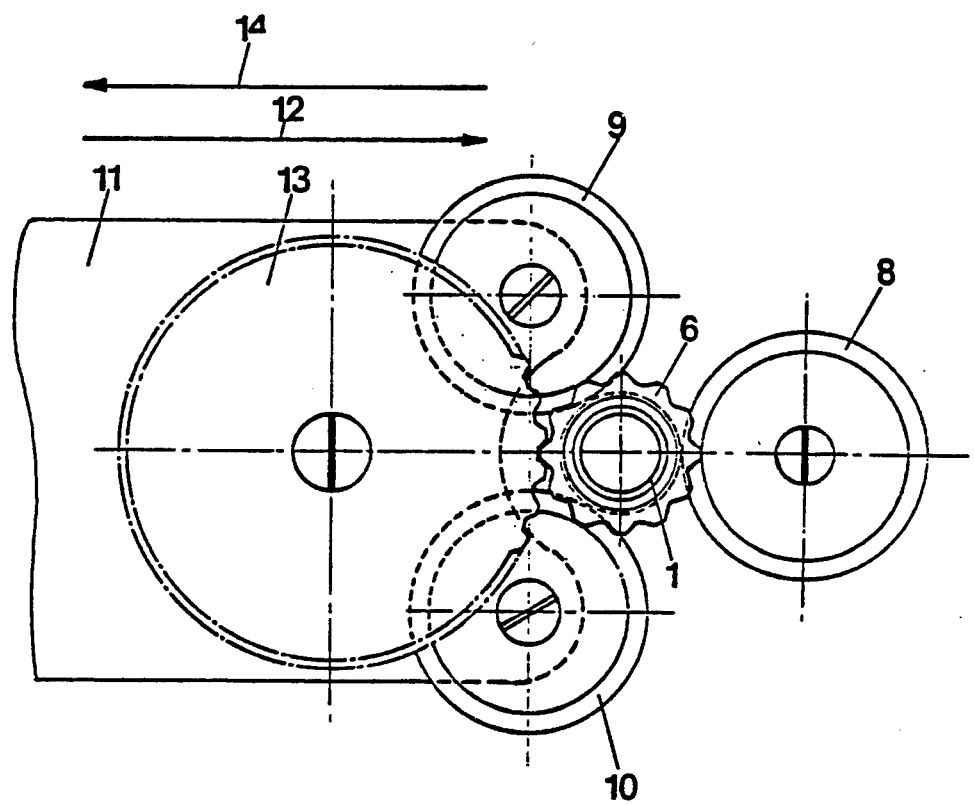

The preform according to the invention as well as the process for blow-moulding this preform are illustrated in the figures of the attached drawings in which:

FIG. 1 is a view in elevation and in section of a preform according to the invention and of a simple device which permits carrying out the process for the production of a hollow article from such a preform and FIG. 2 is a plan view of the items in FIG. 1.

As may be seen from the figures, the preform 1 according to the invention possesses a closed bottom 2 of hemispherical shape and a body 3 of cylindrical shape, surmounted by a profiled false neck 4.

The preform 1 also possesses a partially moulded true neck 5 in the definitive shape of the neck of the desired hollow article and located between its body 3 and its false neck 4. According to the invention, the false neck 4 of the preform 1 possesses a circular toothed collar 6 produced by moulding and located in a plane at rightangles to the longitudinal axis of the preform. The circular toothed collar which is illustrated possesses 12 teeth of trapezoidal profile and is moulded in relief on the false neck 4. Moreover, the profiling of the false neck 4 includes an external circular groove 7 located below the circular toothed collar 6.

According to the process of the invention, the preform 1, during its thermal conditioning prior to final moulding, is caused to rotate about its longitudinal axis by means of the circular toothed collar 6 provided on its false neck 4. For this purpose, the preform 1 is brought in front of a suitable heating element, which is not shown, for example by means of a gripper which is also not shown and which acts on the end of the preform's profiled false neck 4.

The preform is then released by the gripper and is held in the position illustrated, between the fixed idling roller 8 and the idling rollers 9 and 10 mounted on a mobile device 11 which can travel in the direction of the arrow 12, the edges of the rollers 8, 9 and 10 being inserted into the circular groove 7 provided on the profiled false neck 4 of the preform 1.

The preform 1 is then caused to rotate about its longitudinal axis by means of the drive gearwheel 13 which is meshed with the circular toothed collar 6 provided on the false neck 4 of the preform 1. By controlling the rotation of the drive gearwheel 13 it is possible to ensure identical rotation for each of the preforms 1 which are treated successively, and hence to guarantee constant and precise angular positioning of the preforms 1 after thermal treatment.

When the thermal conditioning is complete, the preform 1 is again seized by a gripper, which is not shown, at the end of its profiled false neck 4; this gripper can be the same which has brought the preform into the thermal treatment position, and the preform is transferred by this gripper into a final blow mould after the preform has been disengaged by retraction of the device 11 in the direction of the arrow 14.

I claim:

1. Process for blow-moulding a hollow article, comprising: moulding, from a thermoplastic, a preform having a body of cylindrical general shape surmounted by a profiled false neck possessing a circular toothed collar located in a plane at right angles to the longitudinal axis of the preform; thermally conditioning the preform while causing the preform to rotate about its longitudinal axis by means of a toothed drive member cooperating with the circular toothed collar; and then blow-moulding the desired final hollow article from the conditioned preform.

2. Process according to claim 1, characterised in that the preform is held loosely by means of appropriate holding members (8, 9, 10) cooperating with the profiling of the false neck (4) of the preform (1) whilst the latter is caused to rotate.

3. Process according to claim 1, characterised in that the rotation of the preform (1) during thermal conditioning is controlled so as to ensure the angular indexing of the preform after this treatment.

* * * * *